United States Patent [19]
Lichtman

[11] 3,857,305
[45] Dec. 31, 1974

[54] MILLING CUTTERS

[76] Inventor: Philip Lichtman, 3 Valley Spring Rd., Newton, Mass. 02194

[22] Filed: Apr. 5, 1974

[21] Appl. No.: 458,332

[52] U.S. Cl. ............ 76/101 A, 29/103 R, 29/103 A
[51] Int. Cl. .............................................. B21k 5/12
[58] Field of Search ....... 76/101 A; 29/103 R, 103 A

[56] References Cited
UNITED STATES PATENTS

| | | | |
|---|---|---|---|
| 2,338,156 | 11/1943 | Dougherty | 29/103 A |
| 2,364,305 | 12/1944 | Martin | 29/103 R |
| 3,303,862 | 2/1967 | Westenberger | 29/103 R |

Primary Examiner—Leonidas Vlachos
Attorney, Agent, or Firm—Schiller & Pandiscio

[57] ABSTRACT

A milling tool cutter blank is provided which can be easily modified to produce a special purpose cutter for milling special shapes. The cutter blank comprises a shank and a cutter head formed as an integral extension of the shank. The cutter head includes a heel section and a single straight cutter flute that is at least axially coextensive with the heel section. The cutter head is designed so as to maximize the strength of the flute consistent with the largest practical depth of cut and also to facilitate determination of how far the flute can be cut back without intruding into the heel section when the cutting profile of the flute is being modified to give it a preselected contour.

10 Claims, 6 Drawing Figures

PATENTED DEC 31 1974 3,857,305

MILLING CUTTERS

This invention relates to milling cutters and more particularly to novel milling cutter blanks which are adapted to be modified for specific cutting applications.

A variety of milling cutters are available as standard catalog items for milling a number of common shapes, e.g., for machining circular convex and concave surfaces and for producing straight and standard angle cuts. Frequently, however, a machinist needs to mill a shape for which cutters are not readily available or have not been designed, e.g., non-circular shapes, non-standard angles and odd cross-sections. In such circumstances the machinist has to have a special cutter made at considerable cost and loss of time, or else he has to modify a standard end mill, drill or other tool to suit his specific requirements. However, standard end mills and drills have multiple and/or spiral cutting flutes and, unless the desired cutting shape is extremely simple and easily visualized equally on all of the flutes, two operations are necessary to modify the end mill or drill for a special cutting shape. First it is necessary to remove all but one of the flutes. Secondly the special shape has to be ground into the remaining flute. The latter step is difficult because the flute has a helical aspect and the required shape has to be visualized along the axis of the tool. Relatively few machinists are capable of visualizing how to modify a curved flute to get the desired shape along the tool and the helical aspect rules out the use of standard curve templates to lay out and scribe the proper shape. A further problem with modifying a standard cutter such as an end mill or drill is that it is difficult to judge the depth to which the flute or flutes can be cut or ground without running into the "base circle" or heel of the tool. In most cutters and particularly end mills and drills, the base circle diameter is a large fraction of the tool's overall diameter, so that the depth of allowable cut is limited, and this makes it difficult to properly judge how far a flute can be cut back without intruding into the base circle area. A further problem is that standard tool steel cutters are very hard and cannot be modified easily except by grinding. However, grinding is imprecise if done by hand or expensive if done on a special machine or fixture.

Accordingly the primary object of this invention is to provide a new type of milling cutter which serves as a blank that can be easily modified for cutting special shapes.

A more specific object is to provide a milling cutter blank for the purposes described which is designed so as to facilitate determination of the maximum depth that it can be cut back without interferring with the base circle.

A further specific object is to provide a milling cutter blank which can be furnished either in a hardened state (so that special shapes can be ground in) or without prior hardening heat treatment (so that special shapes can be milled in to great precision on standard shop equipment and the cutter hardened by subsequent treatment).

The foregoing objects and other objects hereinafter described or made obvious are achieved by providing a cutter consisting of a shank and a cutter head that is integral with said shank and includes a single flute that extends parallel to the shank. The single flute has a flat face that extends parallel to the cutter axis and the cutter includes means for indicating the maximum amount that the flute can be cut before running into the base circle or heel. The cutter can be modified for cutting a special shape by sketching or scribing all or part of the desired contour on the flat face of the flute and then grinding or milling the cutting edge of the flute to the desired shape with appropriate accuracy. Scribing or sketching the desired contour can be done easily by laying a template along the flat face of the flute, and the same template also may be used to check the grinding or milling accuracy. Checking also can be accomplished readily with optical comparators.

Other features and many of the attendant advantages of the invention are revealed or rendered obvious by the following detailed description of several embodiments of the invention and the accompanying drawings wherein.

In the several figures, like parts are identified by like numerals.

Figure 1:
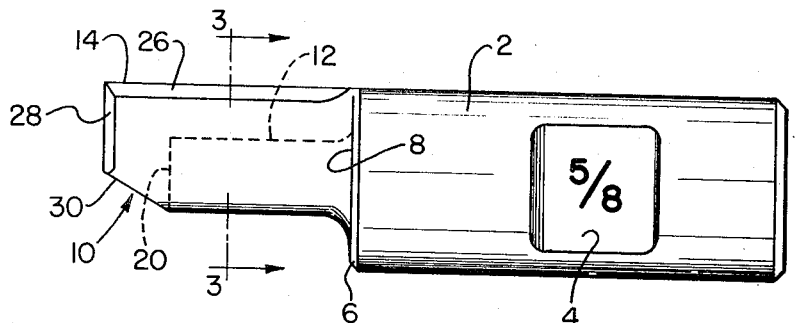
FIG. 1 is a side elevation of a preferred form of milling cutter blank embodying the present inventions.
Figure 3:
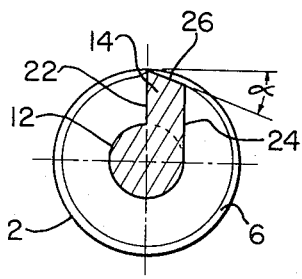
FIG. 3 is a cross-sectional view taken along line 3—3 of FIG. 1.
Figure 2:
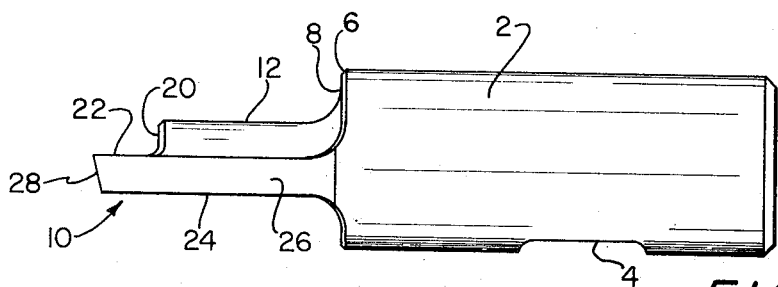
FIG. 2 is a plan view of the same blank.

Referring now to FIGS. 1 and 2, the illustrated cutter blank is made of a suitable tool alloy, e.g., tool steel, and comprises a cylindrical shank 2 which preferably, but not necessarily, is provided with a recessed flat 4 which may serve as a bearing surface for a set screw or a locking or keying member on the machine on which the cutter is to be installed and also to carry an appropriate marking, e.g., a size designation as shown. The front end of shank 2 is bevelled at its edge as shown at 6 and formed as an integral extension of the front surface 8 of the shank is a cutter head which is identified generally by the numeral 10. The head 10 consists of a heel section 12 and a single cutter flute section 14. Heel section 12 is coaxial with shank 2 and has a circular curvature in cross-section as shown in FIG. 3. The cutter flute section 14 extends forwardly of the heel section, with the front end of the latter being shown at 20. Cutter flute section 14 also extends laterally of heel section 12 and comprises a first flat side surface 22 that extends substantially radially of the heel section, a second flat side surface 24 that is substantially tangent to the heel section, and a third longitudinally straight and flat edge surface 26 that extends between surfaces 22 and 24. It is to be noted that the outer edges of surface 22 preferably is flush with the cylindrical side surface of shank 2, but may terminate closer to the axis of the shank. In any event edge surface 26 intersects surfaces 22 and 24 at the oblique angle as shown so as to provide a suitable relief angle to permit chips to fall away from the cutter during use. Cutter flute section 14 also is provided with a flat front edge surface 28 that extends between and intersects surfaces 22 and 24 at an oblique angle. Surface 28 preferably is straight and intersects edge surface 26 at preferably (but not necessarily) a right angle as shown. Additionally the edge 30 of the flute section opposite to edge surface 26 is rounded, extends at a right angle to side surfaces 22 and 24, and is inclined to the axis of the tool so that it preferably intersects edge surface 28 at its intersection with the axis.

Figure 4:
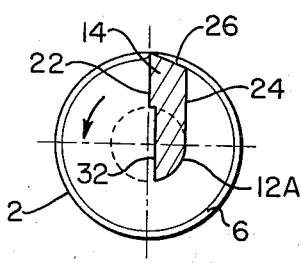
FIGS. 4 and 5 are cross-sectional views similar to that of FIG. 2 of two modifications of the invention.
Figure 5:
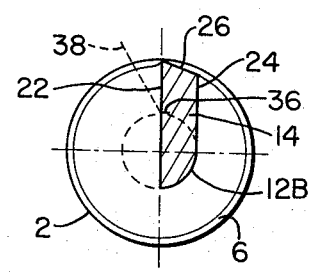

The diameter of heel section 12 is considered the base circle diameter, with the fully circumference of the base circle being completed by the dotted line shown in FIG. 3. The optimum diameter of heel section 12, i.e., of the base circle, is predetermined according to the strength and composition of the stock of which the cutter blank is made and the loads to be imposed on the cutter during use. The diameter of the base circle determines the limit to which edge surface 26 of the flute section can be ground or milled back to form a special cutting tool. The edge surface 26 can be cut back to but not within the base circle. However, if a relief angle is used, as preferred, surface 26 cannot be cut back quite to the base circle as the relief can go only to the base circle. It is to be noted that making the thickness of the flute section equal to the radius of the base circle as shown in FIGS. 3–5 maximizes the strength of the flute section. Also, the bevelled edge surface 28 at the tip of the flute section provides a relief angle that facilitates discarding of chips from the uncut portion of surface 28 when the tip of the flute is shaped to a predetermined contour for end milling of a piece of stock. Preferably, but not necessarily, the edge surfaces 26 and 28 have the same bevel angle.

FIG. 4 shows a modification of the invention. In this case the flute section 14 is unchanged from FIGS. 1–3 but the heel section 12A is cut back so as to have a flat surface 32 which is parallel to but stepped back from surface 22 of the flute section. Surface 32 essentially lies along a chord of the base circle, the circumference of which is completed by the dotted line in FIG. 4. The line of demarcation between surfaces 22 and 32 extends parallel to the tool axis and the step indicates the maximum permissible depth to which the flute can be cut back at its edge surface 26 when making a special purpose cutter.

FIG. 5 shows a further modification in which the heel section 12B is cut back so as to have a flat side surface that is an extension of surface 22 of the flute section. In this case a line 36 is scribed in the flute to demarcate the radius of the base circle. Although not shown, line 36 extends lengthwise of the flute section, preferably for its full length between end surface 8 of the shank and front edge surface 28. The size of line 36 is exaggerated in FIG. 5. In practice, it is relatively thin and scribed in at a very shallow depth. The cutter blank may be supplied with surface 22 painted for easy visibility of lines scribed into the cutter by the machinist.

It is also contemplated that the cutter tool blank could be formed so that side surface 22 extends away from side surface 24, e.g., at an angle as shown by the dotted line 38 in FIG. 5, and in such case it could project radially beyond the side surface of shank 2.

Figure 6:
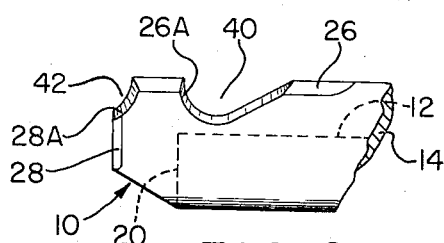
FIG. 6 is a fragmentary side elevation of a combination side and end milling cutter made from a blank of the type shown in FIG. 1.

Cutter blanks made as above-described can be modified to provide cutters for a wide variety of specialized cutting applications. FIG. 6 illustrates a cutter for a special cutting requirement made from a blank of the type shown in FIGS. 1–3.

In this case flute section 14 has been cut back along its edges 26 and 28 so as to form two contoured recesses 40 and 42. The two recesses are formed so as to provide bevelled surfaces 26A and 28A which provide a suitable relief angle for discharging chips during operation of the cutter. As is believed obvious to a person skilled in the art, the cutter of FIG. 6 constitutes a combination end and side milling cutter, with end surfaces 28 and 28A providing a contoured cutting edge for end milling and surfaces 26 and 26A providing a contoured edge for side milling.

As noted previously, an advantage of the invention is that the cutter blanks can be supplied in an unhardened or a hardened condition, thereby giving the machinist the option of modifying them for special cutting applications either by milling or grinding. Also because of the single straight flute construction, modification of the flute to provide a desired cutting edge contour can be achieved quickly and easily by merely mounting a template up against the surface 22 (or scribing the outline of the template in that surface) and then cutting back the cutting edge according to the profile of the template. This edge shaping operation can be conducted with greater precision. In this connection it is to be noted that in use the cutters are driven so that the side surface 22 leads side surface 24, i.e., the cutters are rotated counterclockwise as viewed in FIGS. 3–5. While the distance between the cutting edge of the flute section and the axis preferably is equal to the radius of shank 2, it also may be disposed at a greater or less distance, depending upon how it is used. A further advantage is that the cutter blanks can be made in various sizes and the length of the flute section relative to the length of the heel section may be increased or decreased. It is to be appreciated also that the blanks can be supplied with or without the bevelled surfaces 26 and/or 28. Preferably, however, they are preformed with such surfaces since the added cost is relatively insignificant and also so that the machinist need not grind or machine in the necessary chip relief angle for those portions of the flute that are not cut back in the course of modifying the blank to form a special purpose cutter. With a supply of blanks formed in accordance with this invention made available to him, a machinist can quickly and inexpensively produce a wide assortment of uniquely contoured cutters.

What is claimed is:

1. A milling cutter blank for use in making special purpose cutters comprising:
   a shank having a center axis;
   a cutter head formed as an integral longitudinal extension of said shank, said cutter head comprising a single cutter flute section and a heel section formed integral with said flute section, said heel section having a longitudinally-extending surface that has a circular curvature in cross-section with the center of curvature being aligned with said center axis, said flute section having first and second flat longitudinally-extending side surfaces that are at least coextensive with and also extend laterally of said heel section, said flute section having a third flat longitudinally-extending surface that is radially spaced from said heel section and intersects said first and second side surfaces, with the intersection of said first and third surfaces forming a straight cutting edge that extends parallel to and is radially spaced from said axis, and means on said cutter head for indicating the maximum depth to which said cutting edge can be cut back without intruding into said heel section.

2. A cutter blank according to claim 1 wherein said first side surface lies along a radius of the circle of curvature of said heel section.

3. A cutter blank according to claim 1 wherein said second side surface is tangent to the curved longitudinally extending surface of said heel section.

4. A cutter blank according to claim 3 wherein said first side surface lies along a radius of the circle of curvature of said heel section.

5. A cutter blank according to claim 1 wherein at least a portion of said shank is cylindrical and the distance of said third surface from said axis does not exceed the radius of curvature of said shank.

6. A cutter blank according to claim 1 wherein said first surface lies in a plane that extends diametrically of said heel section and said second surface is parallel to said first surface and is tangent to said heel section.

7. A cutter according to claim 6 wherein said indicating means comprises a longitudinally extending line scribed in said first surface at a distance from said axis equal to the radius of curvature of said heel section.

8. A cutter according to claim 1 wherein said heel section has a flat longitudinally extending surface that is parallel to but offset from said first surface, and said indicating means comprises a flat surface extending between said first surface and the flat surface of said heel section.

9. A cutter according to claim 1 wherein said flute section extends axially beyond said heel section away from said shank and includes a flat end surface that intersects said first, second and third surfaces, said flat end surface being inclined with respect to said first and second end surfaces.

10. A cutter according to claim 1 wherein said first side surface extends radially of an imaginary extension of said shank axis, and the thickness of said flute section measured between said first and second surfaces is no greater than the radius of curvature of the longitudinally-extending surface of said shank.

* * * * *